United States Patent [19]

Krohn

[11] Patent Number: 4,997,194

[45] Date of Patent: Mar. 5, 1991

[54] DRILL CHUCK KEY

[76] Inventor: Timothy L. Krohn, 3823 Woodridge Trace, Wisconsin Rapids, Wis. 54494

[21] Appl. No.: 402,467

[22] Filed: Sep. 5, 1989

[51] Int. Cl.$^5$ .............................................. B23B 31/06

[52] U.S. Cl. ............................... 279/1 K; 408/241 R; 81/16

[58] Field of Search ................ 279/1 K; 81/16, 177.1, 81/489, 176.15; 408/241 R; 74/553, 423; 16/111, 121

[56] References Cited

U.S. PATENT DOCUMENTS

| | | | |
|---|---|---|---|
| 361,155 | 4/1887 | Deeter | 81/177.1 |
| 2,263,277 | 11/1941 | Schumann | 279/1 K |
| 2,388,414 | 11/1945 | Jernigan | 279/1 K |
| 2,592,094 | 4/1952 | Willenbring | 279/1 K X |
| 2,807,732 | 9/1957 | Kurtovich | 279/1 K |
| 2,880,008 | 3/1959 | Stoner | 81/16 X |
| 4,133,543 | 1/1979 | Johnson | 279/1 K |
| 4,182,005 | 1/1980 | Harrington | 279/1 K X |
| 4,467,677 | 8/1984 | Grifford | 81/439 |
| 4,558,495 | 12/1985 | Olsen | 279/1 K X |
| 4,615,653 | 10/1986 | Watson | 279/1 K X |
| 4,718,797 | 1/1988 | Purviance | 408/241 R |
| 4,791,837 | 12/1988 | Main | 81/177.1 X |

FOREIGN PATENT DOCUMENTS

| | | | |
|---|---|---|---|
| 1119144 | 3/1982 | Canada | 279/1 K |
| 3222762 | 12/1983 | Fed. Rep. of Germany | 279/1 K |
| 3345996 | 3/1985 | Fed. Rep. of Germany | 408/241 R |

*Primary Examiner*—Gary F. Paumen
*Assistant Examiner*—Robert Schultz
*Attorney, Agent, or Firm*—Jerry T. Kearns

[57] ABSTRACT

A drill chuck key for use with a conventional Jacobs-type drill chuck includes a cylindrical shaft having a bevel gear secured adjacent one end. A knob has a central cylindrical boss receiving an opposite end of the shaft. A roll pin extends through aligned apertures in the boss and the shaft, securing the knob for rotation with the shaft. A circular ring is received with clearance on the shaft, between the bevel gear and the knob. The ring has a diameter less than the bevel gear and the cylindrical boss and greater than the shaft, such that the ring is captured on the shaft. A chain is connected to the ring for securing the drill chuck key to a selected mounting point. This arrangement allows rotation of the chuck key, without release of the securing chain.

1 Claim, 2 Drawing Sheets

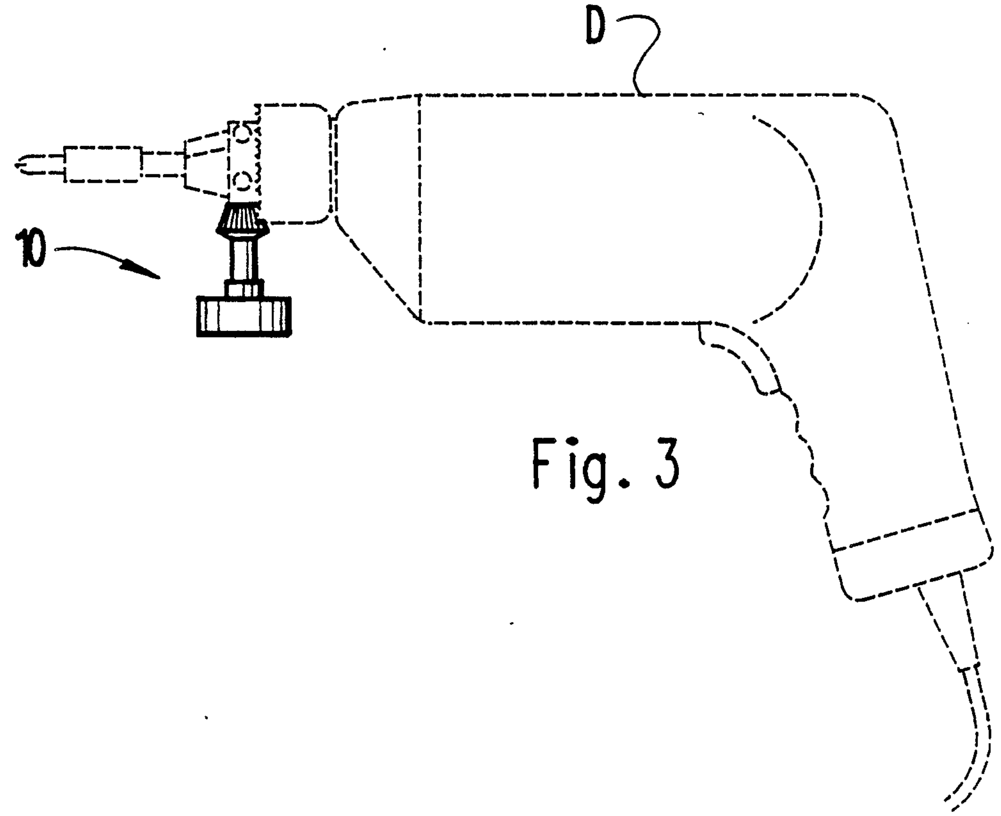
Fig. 3
Fig. 4
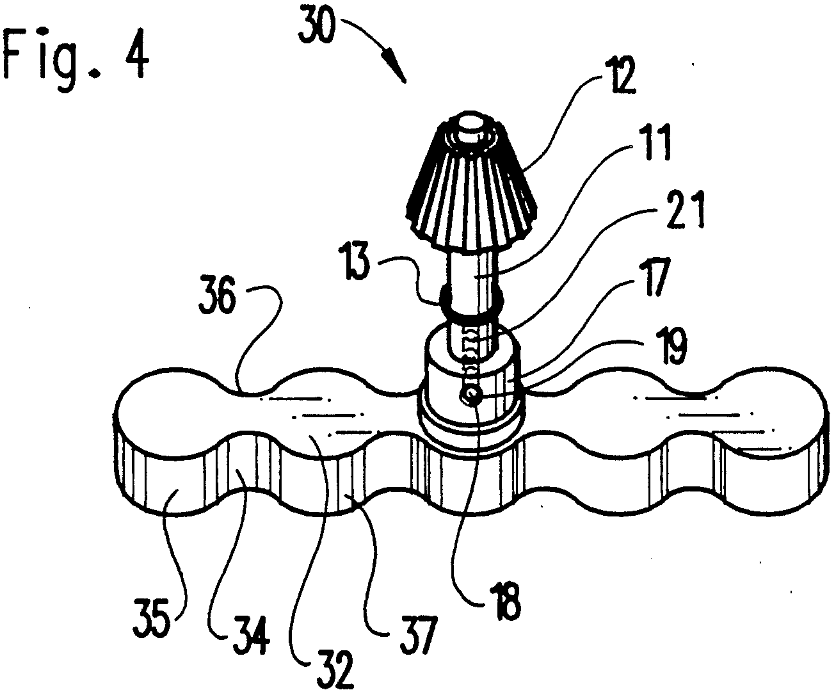

DRILL CHUCK KEY

BACKGROUND OF THE INVENTION

1. Field of the Invention

The present invention relates to drill chuck keys, and more particularly pertains to a drill chuck key for use with the conventional drill chuck of the type known in the industry as a Jacobs-type chuck. A variety of conventional forms of chuck keys have been proposed by the prior art. It is an advantageous safety feature that the chuck key be secured to a stationary mounting surface, to prevent loss of the key, and inadvertent rotation of the drill with the chuck key left in engagement with the drill chuck. Conventional forms of chuck key securing devices have been proposed, but these conventional securing device require release of a securing member from the intended mounting point, prior to rotation of the key. In order to overcome these problems, and to provide a more ergonometrically design and Safer chuck key which allows a larger tightening torque to be easily applied to a drill chuck, the present invention provides an improved drill chuck key.

2. Description of the Prior Art

Various types of drill chuck keys are known in the prior art. A typical example of such a drill chuck keY is to be found in U.S. Pat. No. 4,133,543, which issued to H. Johnson on Jan. 9, 1979. This patent discloses a drill chuck key having a generally triangular loop stem portion which is received with clearance on the power cord of a portable electric drill. U.S. Pat. No. 4,182,005, which issued to M. Harrington on Jan. 8, 1980, discloses a drill chuck key having an elongated cylindrical shaft including a transverse aperture which receives a transversely extending handle portion. U.S. Pat. No. 4,467,677, which issued to D. Grifford on Aug. 28, 1984, discloses a combination tool including intersecting cylindrical shafts. Drill chuck keys of various different standard sizes are provided at opposite ends of each of the shafts. U.S. Pat. No. 4,558,495, which issued to T. Olsen on Dec. 17, 1985, discloses a holder for a drill chuck key for attaching a chuck key to a power cord of a machine tool in a manner that it remains rotatable although not removable from the machine tool. U.S. Pat. No. 4,718,797, which issued to J. Purviance on Jan. 12, 1988, discloses a snap on pad for a drill chuck key having a unitary construction to permit application of a greater torque during tightening and loosening of a drill chuck.

While the above mentioned devices are directed to drill chuck keys, none of these devices disclose a drill chuck key including a cylindrical ring captured between a cylindrical boss of a handle knob in a bevel gear on a chuck key. Additional features of the present invention, not contemplated by the aforesaid prior art devices, include the provision of a generally cylindrical knob having a plurality of circumferentially spaced concave finger depressions, and the provision of a transversely extending elongated bar-shaped handle knob on a drill chuck key having a plurality of concave finger receiving depressions disposed in aligned pairs on opposite sides of the handle bar. Inasmuch as the art is relatively crowded with respect to these various types of drill chuck keys, it can be appreciated that there is a continuing need for and interest in improvements to such drill chuck keys, and in this respect, the present invention addresses this need and interest.

SUMMARY OF THE INVENTION

In view of the foregoing disadvantages inherent in the known types of drill chuck keys now present in the prior art, the present invention provides an improved drill chuck key. As such, the general purpose of the present invention, which will be described subsequently in greater detail, is to provide a new and improved drill chuck key which has all the advantages of the prior art drill chuck keys and none of the disadvantages.

To attain this, representative embodiments of the concepts of the present invention are illustrated in the drawings and make use of a drill chuck key, for use with a conventional Jacobs-type drill chuck, which inCludes a cylindrical shaft having a bevel gear secured adjacent one end. A knob has a central cylindrical boss receiving an opposite end of the shaft. A roll pin extends through aligned apertures in the boss and the shaft, securing the knob for rotation with the shaft. A circular ring is received with clearance on the shaft, between the bevel gear and the knob. The ring has a diameter less than the bevel gear and the cylindrical boss and greater than the shaft, such that the ring is captured on the shaft. A chain is connected to the ring for securing the drill chuck key to a selected mounting point. This arrangement allows rotation of the chuck key, without release of the securing chain.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved drill chuck key which has all the advantages of the prior art drill chuck keys and none of the disadvantages.

It is another object of the present invention to provide a new and improved drill chuck key which may be easily and efficiently manufactured and marketed.

It is a further object of the present invention to provide a new and improved drill chuck key which is of a durable and reliable construction.

An even further object of the present invention is to provide a new and improved drill chuck key which is susceptible of a low cost of manufacture with regard to both materials and labor, and which accordingly is then susceptible of low prices of sale to the consuming public, thereby making such drill chuck keys economically available to the buying public.

Still yet another object of the present invention is to provide a new and improved drill chuck key which provides in the apparatuses and methods of the prior art some of the advantages thereof, while simultaneously overcoming some of the disadvantages normally associated therewith.

Still another object of the present invention is to provide a new and improved drill chuck key which allows the application of a greater tightening torque to a drill chuck.

Yet another object of the present invention is to provide a new and improved drill chuck key which is operable while secured to a stationary mounting point.

Even still another object of the present invention is to provide a new and improved drill chuck key having a handle knob portion provided with a plurality of concave finger depressions to allow application of greater tightening torque to a drill chuck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and object other than those set forth above will become apparent when consideration is given to the following detailed description thereof. Such description makes reference to the annexed drawings wherein:

FIG. 3 is a side view, illustrating the manner of use of the drill chuck key according to the first embodiment of the present invention.

FIG. 4 is a perspective view illustrating a drill chuck key according to a third embodiment of the present invention.

DESCRIPTION OF THE PREFERRED EMBODIMENT

Figure 1:
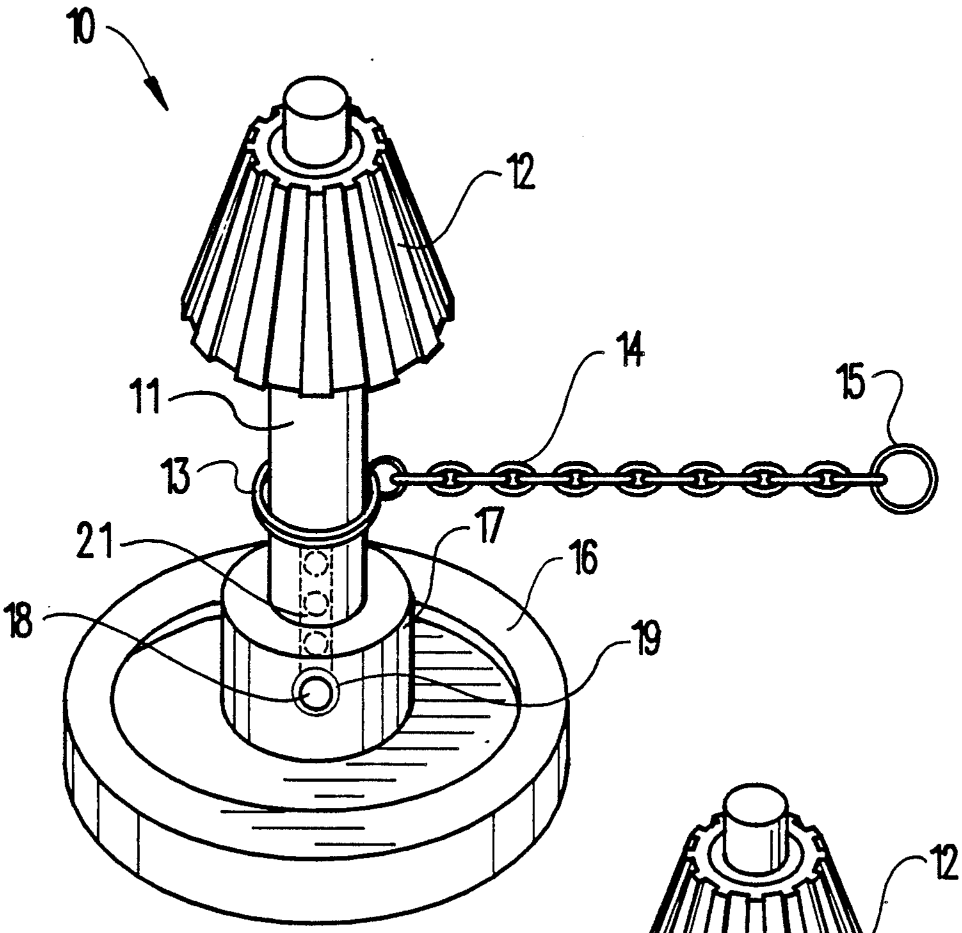
FIG. 1 is a perspective view of a drill chuck key according to a first embodiment of the present invention.

With reference now to the drawings, and in particular to FIG. 1 thereof, a new and improved drill chuck key embodying the principles and concepts of the present invention and generally designated by the reference numeral 10 will be described.

More specifically, it will be noted that the first embodiment 10 of the invention includes a cylindrical shaft 11 having a bevel gear 12 secured adjacent one end. The bevel gear 12 may be formed in a variety of standard sizes, for use with conventional Jacobs-type drill chucks. A cylindrical knob 16 has a central cylindrical boss 17 received on an opposite end of the shaft 11. Aligned transverse apertures 19 and 21 are formed through the boss 17 and shaft 11, and a roll pin 18 is driven through these aligned apertures to secure the knob 16 for rotation with the shaft 11 and bevel gear 12. A circular ring 13 is received with clearance on the shaft 11, between the bevel gear 12 and the knob 16. The ring 13 has a diameter less than the bevel gear and the boss 17. Thus, the ring 13 is securely captured on the shaft 11. A small sized elongated chain 14 has an end loop secured on the ring 13 and an opposite end loop 15 adapted for securement to an intended mounting location. The periphery of the knob 16 may be smooth as illustrated, or provided with a plurality of circumferentially spaced serrations to enhance frictional engagement With the hand Of an individual.

Figure 2:
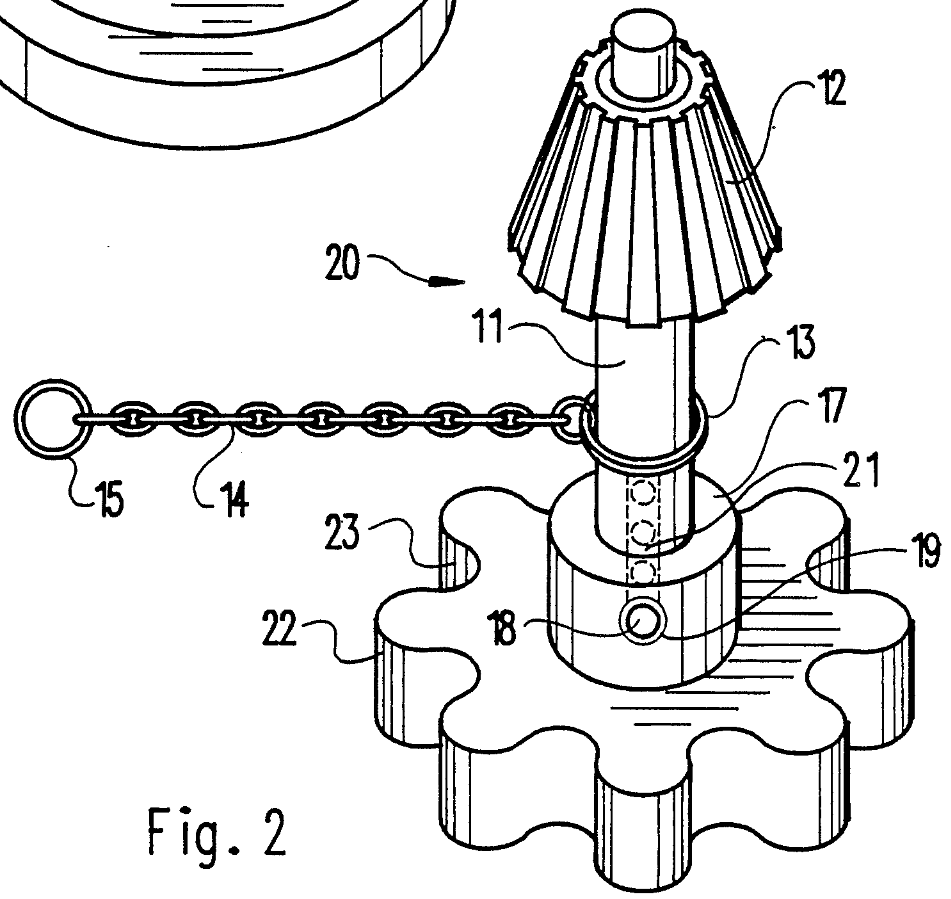
FIG. 2 is a perspective view of a drill chuck key according to a second embodiment of the present invention.

FIG. 2 illustrates a second embodiment 20 of the present invention, in which like reference numerals have been utilized to indicate the previously described parts. The handle knob portion of the chuck key 20 has a generally cylindrical over-all configuration, but is provided with a plurality of circumferentially spaced concave finger receiving notches 23, separated by radiused projections 22. In use, the fingers of an individual are received in the notches 23 to enhance the torque which may be applied for tightening a drill chuck.

FIG. 3 illustrates the conventional manner of use of drill chuck key. The securing chain and attachment ring 13 are omitted from FIG. 3.

FIG. 4 illustrates a perspective view of a drill chuck key according to a third embodiment 30 of the present invention, in which the handle knob portion of the drill chuck key takes the form of an elongated bar 32. The bar 32 is centrally secured in transverse relation to the cylindrical boss 17. The bar 32 has opposite radiused ends, and include generally sinusoidal longitudinal sides having aligned pairs of concave finger receiving depressions 34 and 36. Radiused projections 35 and 37 separate each of the finger receiving depressions, for example 34, such that the handle knob bar 32 has generally sinusoidal longitudinal side surfaces. The securing ring 13 is illustrated received on the shaft 11 of the chuck key 30. The securing chain 14 illustrated in FIG. 2 may additionally be provided, for securing the chuck key 30 to an intended mounting location. As may now be understood, the present invention discloses alternative embodiments of drill chuck keys, each of which are configured to allow operation while remaining secured to a mounting point. Additionally, the novel handle configuration of the disclosed drill chuck key embodiments allow the application of a substantially greater tightening torque, than available with the conventional form drill chuck key.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A drill chuck key, comprising:

a cylindrical shaft;

a bevel gear secured adjacent one end of said shaft and dimensioned for engagement with a conventional Jacobs-type drill chuck;

a central cylindrical boss receiving an opposite end of said shaft;

an elongated bar having a central portion transversely connected to said boss, said bar having opposite radiused ends, and opposite longitudinal sides provided with a sinusoidal wave form configuration, forming at least four aligned pairs of concave finger depressions;

a roll pin extending through aligned apertures in said boss and in said shaft, securing said bar for rotation with said shaft;

a circular ring received with clearance on said shaft, between said bevel gear and said boss, said ring having a diameter less than said bevel gear and said cylindrical boss and greater than said shaft; and an elongated flexible securing member secured to said ring for attaching said drill chuck key to a selected mounting point.

* * * * *